(12) United States Patent
Liu et al.

(10) Patent No.: US 11,772,999 B2
(45) Date of Patent: Oct. 3, 2023

(54) SYSTEM AND METHOD FOR TREATING REVERSE-OSMOSIS CONCENTRATED WATER WITH HIGH TEMPORARY HARDNESS

(71) Applicant: Greentech Environment Co., Ltd., Beijing (CN)

(72) Inventors: Mu Liu, Beijing (CN); Zehua Li, Beijing (CN); Mengyuan Duan, Beijing (CN); Huiming Han, Beijing (CN); Xiaofeng Lin, Beijing (CN); Yingqiang Su, Beijing (CN); Kai Sun, Beijing (CN); Xikun Zhu, Beijing (CN); Liyan Zhang, Beijing (CN)

(73) Assignee: Greentech Environment Co., Ltd., Beijing (CN)

( * ) Notice: Subject to any disclaimer, the term of this patent is extended or adjusted under 35 U.S.C. 154(b) by 0 days.

(21) Appl. No.: 18/193,681

(22) Filed: Mar. 31, 2023

(65) Prior Publication Data
US 2023/0234870 A1    Jul. 27, 2023

(30) Foreign Application Priority Data
Jul. 8, 2022 (CN) .......................... 202210800091.1

(51) Int. Cl.
*C02F 9/00* (2023.01)
*C02F 1/00* (2023.01)
*C02F 1/52* (2023.01)
*C02F 1/66* (2023.01)
(Continued)

(52) U.S. Cl.
CPC ................ *C02F 9/00* (2013.01); *C02F 1/006* (2013.01); *C02F 1/5209* (2013.01); *C02F 1/38* (2013.01); *C02F 1/66* (2013.01); *C02F 5/06* (2013.01); *C02F 2001/5218* (2013.01); *C02F 2201/005* (2013.01); *C02F 2209/005* (2013.01);
(Continued)

(58) Field of Classification Search
None
See application file for complete search history.

(56) References Cited

U.S. PATENT DOCUMENTS

2016/0368783 A1    12/2016    Ertel et al.
2021/0261447 A1     8/2021    Zhang et al.

FOREIGN PATENT DOCUMENTS

| CN | 106396169 A | 2/2017 |
|---|---|---|
| CN | 107001087 A | 8/2017 |

(Continued)

*Primary Examiner* — Peter Keyworth

(57) ABSTRACT

A system and method for treating reverse-osmosis (RO) concentrated water with high temporary hardness. The system includes a crystallization unit, a precipitation unit, a dewatering unit, and a programmable logic controller (PLC) system. The crystallization unit, precipitation unit and dewatering unit are connected in series, and the PLC system is configured to control pumps, valves, and displays in the crystallization unit, precipitation unit and dewatering unit. The crystallization unit includes a storage tank and a crystallization reactor communicated therewith. The crystallization reactor is provided with a pH meter, a liquid-level gauge, and a stirrer. A connection pipe between the crystallization reactor and the RO concentrated water is provided with an inlet pump and a inlet valve. A connection pipe between the crystallization reactor and the storage tank is provided with a feeding pump and a feeding valve.

12 Claims, 1 Drawing Sheet

(51) Int. Cl.
*C02F 5/06* (2023.01)
*C02F 1/38* (2023.01)

(52) U.S. Cl.
CPC ...... *C02F 2209/06* (2013.01); *C02F 2209/42* (2013.01); *C02F 2209/44* (2013.01)

(56) References Cited

FOREIGN PATENT DOCUMENTS

| | | |
|---|---|---|
| CN | 109574307 A | 4/2019 |
| CN | 112919734 A | 6/2021 |

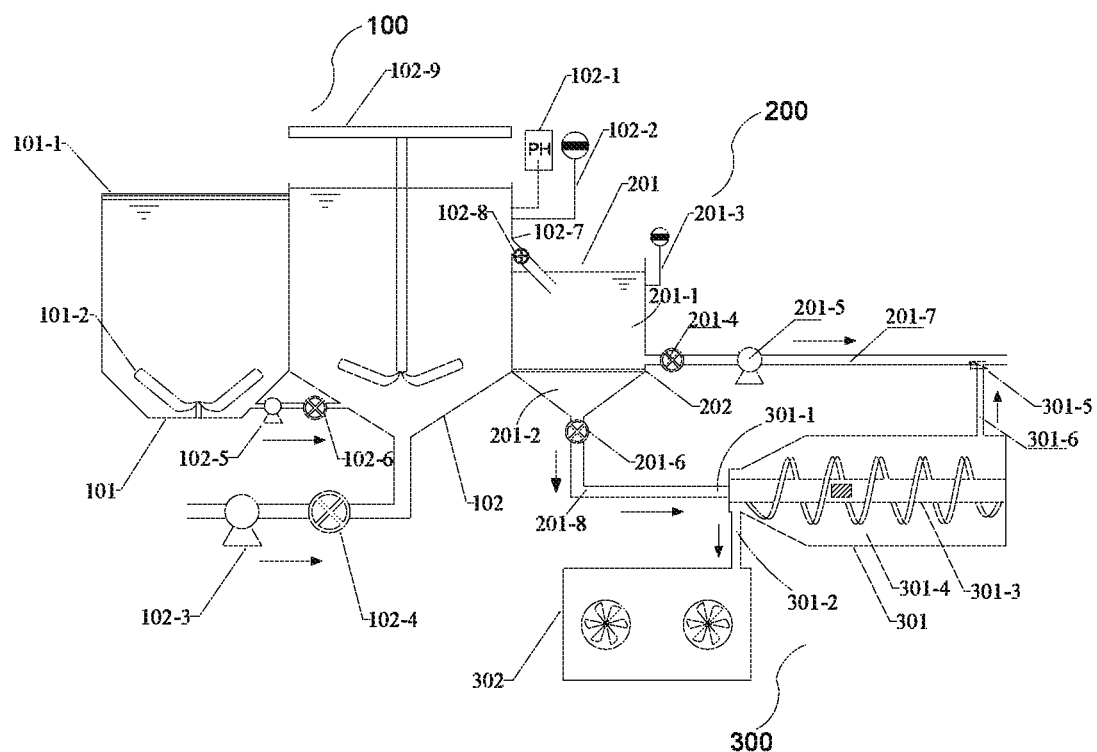

SYSTEM AND METHOD FOR TREATING REVERSE-OSMOSIS CONCENTRATED WATER WITH HIGH TEMPORARY HARDNESS

CROSS-REFERENCE TO RELATED APPLICATIONS

This application claims the benefit of priority from Chinese Patent Application No. 202210800091.1, filed on Jul. 8, 2022. The content of the aforementioned application, including any intervening amendments thereto, is incorporated herein by reference in its entirety.

TECHNICAL FIELD

This application relates to wastewater treatment, and more particularly to a system and method for treating reverse-osmosis (RO) concentrated water with high temporary hardness.

BACKGROUND

Temporary hardness occurs due to the presence of calcium and magnesium carbonates and bicarbonates. The lime softening method is commonly used in the removal of temporary calcium hardness, and the calcium carbonate crystallization method has also demonstrated feasible for removing the temporary calcium hardness. These methods both introduce an alkaline reagent (such as calcium hydroxide and sodium hydroxide) to raw water to cause an increase in the pH, so as to promote the hydrolysis of carbonate salts, thereby forming the calcium carbonate precipitate to remove the temporary calcium hardness. The above methods are efficient and feasible, but also struggle with large reagent consumption and high operating costs.

Calcium bicarbonate solids are slightly soluble with a solubility of about 0.133 g/100 g. If the concentration of free calcium bicarbonate in water exceeds this value, it indicates that calcium ions and bicarbonate ions in water are converted from a non-saturated state to a meso-stable or saturated state. In such cases, autogenous nuclei of calcium bicarbonate can be formed, which then forms calcium bicarbonate crystals. It is noted that the contents of calcium ions and carbonates in reverse-osmosis (RO) concentrated water are generally several times higher than those in the raw water, which often can meet the above conditions. Therefore, it is promising to lower the temporary hardness of the RO concentrated water by utilizing calcium bicarbonate crystallization.

SUMMARY

To overcome the above-mentioned technical problems, this application discloses a system and method for treating reverse-osmosis (RO) concentrated water with high temporary hardness. By using the system and method provided herein, the temporary hardness in the RO wastewater can be removed by calcium bicarbonate crystallization.

Technical solutions of the present disclosure are described as follows.

In a first aspect, the present disclosure provides a system for treating RO concentrated water with high temporary hardness, comprising:
a crystallization unit;
a precipitation unit;
a dewatering unit; and
a programmable logic controller (PLC) system;
wherein the crystallization unit, the precipitation unit, and the dewatering unit are connected in series; and the PLC system is configured to control pumps, valves, and displays in the crystallization unit, the precipitation unit, and the dewatering unit;

the crystallization unit comprises a storage tank and a crystallization reactor; the storage tank is configured for holding a calcium hydroxide suspension; the storage tank is in communication with the crystallization reactor; a pH meter, a first liquid-level gauge, and a first stirrer are provided in the crystallization reactor; a pipe connecting the crystallization reactor with the RO concentrated water is provided with a water inlet pump and a water inlet valve; and a pipe connecting the crystallization reactor with the storage tank is provided with a feeding pump and a feeding valve;

the precipitation unit comprises a precipitation-concentration tank; the precipitation-concentration tank is connected to an overflow port provided on a side wall of the crystallization reactor; the overflow port is provided with a first outlet valve; a telescopic baffle is provided in the precipitation-concentration tank to divide the precipitation-concentration tank into a crystal slurry storage part and a supernatant storage part; the precipitation-concentration tank is also provided with a second liquid-level gauge; a first liquid discharging end is provided at a bottom of the supernatant storage part; and a second outlet valve and a discharge pump are provided at the first liquid discharging end; and the dewatering unit comprises a horizontal spiral centrifuge and a freezer bin; a feeding end of the horizontal spiral centrifuge is connected to a first material discharging end arranged at a bottom of the precipitation-concentration tank; the first material discharging end is provided with a discharge valve; the horizontal spiral centrifuge has a second liquid discharging end and a second material discharging end; the second material discharging end is connected to the freezer bin; the second liquid discharging end is connected to the first liquid discharging end; and a one-way valve is provided at a position where the second liquid discharging end and the first liquid discharging are connected.

In some embodiments, a volume between the overflow port and a top of the crystallization reactor is 1/3 of a volume of the crystallization reactor.

In some embodiments, a volume of the precipitation-concentration tank is not less than 1/3 of a volume of the crystallization reactor; and a top of the precipitation-concentration tank is lower than a position of the side wall of the crystallization reactor where the overflow port is located.

In some embodiments, a bottom diameter of the crystal slurry storage part is smaller than a top diameter of the crystal slurry storage part; and a volume of the crystal slurry storage part is 10% or more of the volume of the precipitation-concentration tank.

In some embodiments, an end cover is arranged at a top of the storage tank for sealing; a second stirrer is provided in the storage tank; and a mass percent concentration of the calcium hydroxide suspension is not less than 10%.

In some embodiments, a motion state of the telescopic baffle is controlled by the PLC system. Preferably, the telescopic baffle is composed of a plurality of strips. The plurality of strips are arranged on a frame fixedly connected with the inner side wall of the precipitation-concentration tank. When the telescopic baffle is turned off, the plurality of strips are in a horizontal position and connected to each other. When the telescopic baffle is turned on, the plurality of strips are all turned to a vertical position, with gaps exposed between the strips.

In a second aspect, this application provides a method for treating RO concentrated water with temporary hardness, comprising:

(S1) operating a first stirrer continuously such that a calcium hydroxide suspension in a storage tank is kept uniformly mixed; wherein a mass fraction of the calcium hydroxide suspension is not less than 10%; since the mass fraction is much higher than a mass fraction of a saturated calcium hydroxide solution at room temperature (1%), the calcium hydroxide solution is in suspension and requires continuous stirring; the mass fraction ensures that a volume ratio of calcium hydroxide solution to raw water is not significantly higher than 1:100, avoiding significant interference of the raw water on hydraulic retention time in the crystallization reactor;

(S2) opening a water inlet valve and turning on a water inlet pump to allow the RO concentrated water to enter a crystallization reactor at a first preset rate; and turning on a second stirrer in the crystallization reactor, wherein a rotation speed of the second stirrer is controlled to be 80-120 r/min, and a ratio of a volume (L) of the crystallization reactor to the first preset rate (L/min) is not less than 90 min; wherein if the rotation speed is below this range, generated calcium bicarbonate crystals may be deposited and retained in the crystallization reactor by gravity; and if the rotatory speed is above this range, the formation process of crystals through gradual expansion of the nuclei may be disrupted, resulting in the fragmentation of the calcium bicarbonate crystals;

(S3) opening a feeding valve and turning on a feeding pump to allow the calcium hydroxide suspension in the storage tank to enter the crystallization reactor with a second preset rate to be fully mixed with the RO concentrated water, so as to form a mixture, wherein the second preset rate is set such that a feeding rate of calcium hydroxide in the calcium hydroxide suspension is 0.1 g/(L min)+10%; and the feeding speed ensures a high crystallization reaction rate and prevents the pH meter from lagging due to the rapid feeding of the calcium hydroxide suspension, which affects the precise control of the pH range of the raw water during the crystallization process;

(S4) sending, by a first liquid-level gauge, a first feedback signal to a PLC system after monitoring that a liquid level of the mixture in the crystallization reactor reaches a top of the crystallization reactor; under control of the PLC system, closing the water inlet valve and turning off the water inlet pump, and opening a first outlet valve, so that the mixture in the crystallization reactor is transferred to a precipitation-concentration tank; sending, by the first liquid-level gauge, a second feedback signal to the PLC system after monitoring that the liquid level of the mixture in the crystallization reactor is lower than the overflow port; and under the control of the PLC system, closing the first outlet valve, opening the water inlet valve and turning on the water inlet pump;

(S5) subjecting the mixture to standing in the precipitation-concentration tank for a first preset duration for precipitation and clarification; controlling, by the PLC system, to close a telescopic baffle, open a second outlet valve and a discharge valve, and turn on a discharge pump, so that a supernatant in a supernatant storage part is discharged, and a calcium bicarbonate crystal slurry in a crystal slurry storage part flows into a horizontal spiral centrifuge;

(S6) discharging a liquid separated from the calcium bicarbonate crystal slurry; and transferring calcium bicarbonate crystals to a freezer bin, wherein a temperature in the freezer bin is not higher than 0° C., so as to avoid the slow decomposition of the calcium bicarbonate crystals at temperatures above 0° C.; and (S7) repeating steps (S4)-(S6) until the temporary hardness reaches a preset value.

In some embodiments, the method further comprises:

monitoring a pH of the mixture in the crystallization reactor by using a pH meter in real time while performing steps (S3)-(S4);

wherein when the pH >8.30, the pH meter sends a third feedback signal to the PLC system, and under control of the PLC system, the feeding pump turned off, and the feeding valve is closed to stop feeding; and when the pH<8.00, the pH meter sends a fourth feedback signal to the PLC system, and under the control of the PLC system, the feeding pump is turned off, and the feeding valve is opened to feed the calcium hydroxide suspension.

In some embodiments, a maximum hydraulic retention time of the RO concentrated water in the crystallization reactor is no less than 90 min, and a minimum hydraulic retention time of the RO concentrated water in the crystallization reactor is no less than 60 min. If the hydraulic retention time is lower than this range, the crystallization reaction undergoes inadequately, and the removal rate of temporary calcium hardness is relatively low. If the hydraulic retention time is higher than this range, the increase in the removal rate of the temporary calcium hardness begins to level off. The maximum and minimum hydraulic retention time are calculated at the actual capacity of the system while ensuring an adequate crystallization.

In some embodiments, the first preset duration is not less than 25, min and is not larger than a difference between the maximum hydraulic retention time and the minimum hydraulic retention time; and the difference between the maximum hydraulic retention time and the minimum hydraulic retention time is not less than 30 min.

Compared to the prior art, the present disclosure has the following beneficial effects.

(1) The system provided herein ensures that the carbonate in the raw water basically exists in the form of bicarbonate by precisely controlling the pH of the raw water, so that the crystallization reaction of calcium bicarbonate can be carried out smoothly. In such cases, the removal rate of temporary hardness reaches more than 85%, and the calcium hydroxide consumption is significantly reduced. Particularly, it can reduce calcium hydroxide consumption by about 14-32% compared with the lime softening method.

(2) The system provided herein fully takes the characteristics of calcium bicarbonate crystals, such as small size and high sedimentation difficulty into account. By independently arranging a precipitation-concentration tank and a centrifugal dewatering machine, and reasonably controlling the frequencies of water inlet and outlet, calcium bicarbonate crystals and water are fully separated while ensuring the operation efficiency of the crystallization reactor.

(3) The system provided herein does not require the addition of other auxiliary reagents such as flocculants, and the by-product calcium bicarbonate crystals have high purity and can be recycled to generate economic benefits.

(4) The system provided herein is integrated and linked in control, which is easy to operate and highly feasible.

BRIEF DESCRIPTION OF THE DRAWINGS

The accompanying drawings herein are incorporated into and form part of the specification, which illustrate embodiments of the present disclosure and are used to explain the principles of the present disclosure in conjunction with the specification.

To illustrate the technical solutions in the embodiments of the present disclosure or in the prior art more clearly, the accompanying drawings that are required for the description of the embodiments or the prior art are briefly described. Obviously, other accompanying drawings can be obtained by one of ordinary skill in the art without paying for creative work based on these drawings.

The FIGURE schematically shows a structure of a system for treating reverse osmosis (RO) concentrated water with high temporary hardness according to an embodiment of the present disclosure.

In the FIGURE: 100, crystallization unit; 101, storage tank; 101-1, end cover; 101-2, first stirrer; 102, crystallization reactor; 102-1, pH meter; 102-2, first liquid-level gauge; 102-3, water inlet pump; 102-4, water inlet valve; 102-5, feeding pump; 102-6, feeding valve; 102-7, overflow port; 102-8, first outlet valve; 102-9, second stirrer; 200, precipitation unit; 201, precipitation-concentration tank; 201-1, crystal slurry storage part; 201-2, supernatant storage part; 201-3, second liquid-level gauge; 201-4, second outlet valve; 201-5, discharge pump; 201-6, discharge valve; 201-7, first liquid discharging end; 201-8, first material discharging end; 202, telescopic baffle; 300, dewatering unit; 301, horizontal spiral centrifuge; 301-1, feeding end; 301-2, second material discharging end; 301-3, center bolt; 301-4, drum; 301-5, one-way valve; 301-6, second liquid discharging end; and 302, freezer bin.

DETAILED DESCRIPTION OF EMBODIMENTS

To facilitate the understanding of the above-mentioned objects, features and advantages of the present disclosure, the present disclosure will be described below with reference to embodiments. It should be noted that the embodiments of the present disclosure and the features therein can be combined with each other in the absence of contradiction.

In the prior art, alkaline reagents (such as calcium hydroxide and sodium hydroxide) are added into raw water to increase the pH value thereof, which facilitates the ionization hydrolysis reaction of carbonate to move toward the direction of carbonate generation, resulting in formation of calcium carbonate precipitation, so as to remove temporary calcium hardness. However, the drug consumption and costs are high. In addition, it is known to one of ordinary skill in the art that calcium bicarbonate solids are soluble but have a low solubility of about 0.133 g/100 g. If the concentration of free-state calcium bicarbonate in water exceeds this value, it indicates that calcium ions and bicarbonate ions in water are converted from non-saturated state to meso-stable or saturated state. In such cases, autogenous nuclei of calcium bicarbonate can be formed, which then will form calcium bicarbonate crystals. Consequently, this application provides a system and method for removing the temporary hardness of the RO concentrated water through calcium bicarbonate crystallization.

Although many specific details are described in the following description to facilitate the understanding of the present disclosure, the present disclosure can also be implemented in other ways. Obviously, described below are only some embodiments of the present disclosure, which are not intended to limit the disclosure.

Embodiment 1

As shown in the FIGURE, a system for treating reverse-osmosis (RO) concentrated water with high temporary hardness is provided, which includes a crystallization unit 100, a precipitation unit 200, and a dewatering unit 300 connected in series. The system also includes a programmable logic controller (PLC) system, which is configured to control pumps, valves, and displays in each unit. The PLC system and related circuit structure are not represented in the accompanying future, but they do exist.

The crystallization unit 100 includes a storage tank 101 and a crystallization reactor 102, and the storage tank 101 is configured for holding a calcium hydroxide suspension. The storage tank 101 is in communication with the crystallization reactor 102. The crystallization reactor 102 is provided with a pH meter 102-1, a first liquid-level gauge 102-2, and a second stirrer 102-9. A pipe connecting the crystallization reactor 102 with the RO concentrated water is provided with a water inlet pump 102-3 and a water inlet valve 102-4, and the RO concentrated water passes through a water inlet pump 102-3 and a water inlet valve 102-4 to enter the crystallization reactor 102. A pipe connecting the crystallization reactor 102 with the storage tank 101 is provided with a feeding pump 102-5 and a feeding valve 102-6. The pH meter 102-1 in the crystallization reactor 102 is configured to monitor the pH value of the RO concentrated water in real time, and to control on and off of the feeding pump 102-5 and the feeding valve 102-6 by cooperating with the PLC system. The first liquid-level gauge 102-2 is configured to monitor a liquid level height in the crystallization reactor 102 in real time, and to control on and off of the water inlet pump 102-3, the water inlet valve 102-4, and a discharging valve 102-8 by cooperating with the PLC system to. Since calcium hydroxide is easy to deteriorate after being exposed to carbon dioxide in the air, an end cover 101-1 is arranged at a top of the storage tank 101 for sealing. The storage tank 101 is provided with a first stirrer 101-2. The first stirrer 101-2 is configured to stir the calcium hydroxide suspension at a constant speed, so as to maintain a long-term uniform mixing state of the calcium hydroxide suspension in the storage tank 101, where a mass fraction of the calcium hydroxide suspension is not less than 10%.

The precipitation unit 200 includes a precipitation-concentration tank 201. The precipitation-concentration tank 201 is connected to an overflow port 102-7 provided on a side wall of the crystallization reactor 102. The overflow port 102-7 is provided with a first outlet valve 102-8. The precipitation-concentration tank 201 is provided with a telescopic baffle 202 configured to divide the precipitation-concentration tank 201 into a crystal slurry storage part 201-1 and a supernatant storage part 201-2. The precipitation-concentration tank 201 is also provided with a second liquid-level gauge 201-3 configured for displaying the turbidity of the mixture in the precipitation-concentration tank 201. The second liquid-level gauge 201-3 is electrically connected to the PLC system, and is configured to control on and off of the telescopic baffle 202. A first liquid discharging end 201-7 is provided at a bottom of the supernatant storage part 201-2, and a second outlet valve 201-4 and a discharge pump 201-5 are provided at the first liquid discharging end.

The volume between the overflow port 102-7 on the crystallization reactor 102 and the top of the crystallization reactor 102 is ⅓ of the volume of the crystallization reactor 102. The volume of the precipitation-concentration tank 201 is not less than ⅓ of the volume of the crystallization reactor 102, and the top of the precipitation-concentration tank 201 is lower than the position where the overflow port 102-7 is on the side wall of the crystallization reactor 102. The bottom diameter of the crystal slurry storage part 201-1 is smaller than its top diameter, and the volume of the crystal slurry storage part 201-1 is more than 10% of the volume of the precipitation-concentration tank 201. Referring to the FIGURE, preferably, the upper part of the crystallization reactor 102 and the precipitation-concentration tank 201 are both cylindrical bodies, and the lower part of the crystallization reactor 102 and the precipitation-concentration tank 201 are both inverted cones. The telescopic baffle 202 is arranged where the cylindrical body and the inverted cone are injunction.

In addition, the dewatering unit 300 includes a horizontal spiral centrifuge 301 and a freezer bin 302. A feeding end 301-1 of the horizontal spiral centrifuge 301 is connected to a first material discharging end 201-8 arranged at the bottom of the precipitation-concentration tank 201. The second material discharging end 301-2 of the horizontal spiral centrifuge 301 is connected to the freezer bin 302. A second liquid discharging end 301-6 of the horizontal spiral centrifuge 301 is connected to a first liquid discharging end 201-7, and a one-way valve 301-5 is provided at the position where the second liquid discharging end 301-6 and the first liquid discharging end 201-7 are connected. The horizontal spiral centrifuge 301 includes a central bolt 301-3 and a drum 301-4. The centrifugal stratification of the calcium bicarbonate crystal slurry is achieved by the differential rotation of the central bolt 301-3 and the drum 301-4.

The system provided in this embodiment allow individual containers (such as the crystallization reactor 102 and the precipitation-concentration tank 201) to be arranged independently, while the on-and-off state of valves and pumps connected to individual containers is influenced by the pH meter and the first liquid-level gauge arranged in each container and finally controlled by the PLC system, thus enabling a whole set of linkage devices for removing and reducing the temporary hardness of the RO concentrated water.

Embodiment 2

Provided herein is a method for treating reverse osmosis (RO) concentrated water with high temporary hardness by using the aforementioned system. The method includes the following steps.

(S1) Calcium hydroxide suspension in the storage tank 101 is kept uniformly mixed for a long time, where the calcium hydroxide is not less than 10% by weight of the calcium hydroxide suspension.

(S2) The water inlet valve 102-4 is opened and the water inlet pump 102-3 is turned on to allow the RO concentrated water to enter the crystallization reactor 102 at a first preset rate. Then the second stirrer 102-9 in the crystallization reactor 102 is turned on, where the rotation speed of the second stirrer 102-9 is controlled to be 80-120 r/min, and a ratio of the volume (L) of the crystallization reactor 102 to the first preset rate (L/min) is not less than 90 min.

(S3) The feeding valve 102-6 is opened and the feeding pump 102-5 is turned on to allow the calcium hydroxide suspension in the storage tank 101 to enter the crystallization reactor 102 with a second preset rate to be fully mixed with the RO concentrated water, where the second preset rate is set such that a feeding rate of calcium hydroxide in the calcium hydroxide suspension is 0.1 g/(L min)+10%.

(S4) The pH meter 102-1 is configured to monitor the pH of the RO concentrated water in real time. When the pH >8.30, the pH meter 102-1 sends a first feedback signal to the PLC system, then the feeding pump 102-5 and the feeding valve 102-6 are turned off under the control of the PLC system to stop feeding. When the pH<8.00, the pH meter 102-1 sends a second feedback signal to the PLC system, then the feeding pump 102-5 and the feeding valve 102-6 are turned on under the control the PLC system to replenish feeding.

After monitoring that a liquid level of the mixture in the crystallization reactor 102 rises to the top of the crystallization reactor 102, the first liquid-level gauge 102-2 sends a first feedback signal to the PLC system, the water inlet valve 102-4 and the water inlet pump 102-3 are turned off and the first outlet valve 102-8 is turned on, under the control of the PLC system, so that the mixture in the crystallization reactor 102 is transferred to the precipitation-concentration tank 201. After monitoring that the liquid level of the mixture in the crystallization reactor 102 is lower than the position of the overflow port 102-7, the first liquid-level gauge 102-2 sends a second feedback signal to the PLC system, then the first outlet valve 102-8 is turned off, and the water inlet valve 102-4 and the water inlet pump 102-3 are turned on, under the control of the PLC system. The RO concentrated water in the crystallization reactor 102 has a maximum hydraulic retention time of no less than 90 min and a minimum hydraulic retention time of no less than 60 min, that is, the crystallization reaction time of the RO concentrated water is 60-90 min.

(S5) The mixture liquid in the precipitation-concentration tank 201 is precipitated and clarified in a static state for a first preset duration. After that, the telescopic baffle 202 is turned off, the second outlet valve 201-4, the discharge pump 201-5, and the discharge valve 201-6 are opened, under the control of the PLC system In such a case, the supernatant in the supernatant storage part 201-2 is discharged, and the calcium bicarbonate crystal slurry in the crystal slurry storage part 201-1 flows into the horizontal spiral centrifuge 301. The first preset duration is not less than 25 min and not higher than the difference between the maximum hydraulic retention time and the minimum hydraulic retention time, and the difference between the maximum hydraulic retention time and the minimum hydraulic retention time is not less than 30 min.

(S6) The liquid separated from the calcium bicarbonate crystal slurry is discharged, and the calcium bicarbonate crystals are transferred to the freezer bin 302, where the room temperature of the freezer bin 302 is not higher than 0° C.

(S7) Steps (S4)-(S6) are repeated until the temporary hardness reaches a preset value.

Experimental Example

The reverse osmosis (RO) concentrated water is treated by using the method provided in Example 2, and results are shown in Tables 1 and 2.

TABLE 1

Effects of crystallization time on the removal rate of the temporary calcium hardness of the RO concentrated water

| Crystal-lization pH | Temporary calcium hardness [mg (CaCO$_3$)/L] | Cumulative dosage of Ca(OH)$_2$ [g/L] | Temporary calcium hardness [mg (CaCO$_3$)/L] | Removal rate of temporary calcium hardness (%) | Cumulative dosage of Ca(OH)$_2$ [g/L] | Temporary calcium hardness [mg (CaCO$_3$)/L] | Removal rate of temporary calcium hardness (%) | Cumulative dosage of Ca(OH)$_2$ [g/L] | Temporary calcium hardness [mg (CaCO$_3$)/L] | Removal rate of temporary calcium hardness (%) |
|---|---|---|---|---|---|---|---|---|---|---|
| | Crystallization reaction time: 0 min | | Crystallization reaction time: 30 min | | | Crystallization reaction time: 60 min | | | Crystallization reaction time: 90 min | | |
| 7.5 | 2080.18 | 0 | 2051.28 | 23.62 | 0 | 1955.97 | 28.20 | 0 | 1955.97 | 28.20 |
| 7.6 | 2080.18 | 0.789 | 1272.21 | 61.08 | 0.789 | 1272.21 | 61.08 | 0.789 | 1272.21 | 61.08 |
| 7.7 | 2080.18 | 0.7 | 1203.83 | 64.36 | 0.79 | 1181.04 | 65.46 | 0.828 | 1011.14 | 73.63 |
| 7.8 | 2080.18 | 1.021 | 977.98 | 75.22 | 1.096 | 924.11 | 77.81 | 1.096 | 870.24 | 80.40 |
| 7.9 | 2080.18 | 0.82 | 870.24 | 80.40 | 0.82 | 849.52 | 81.39 | 0.82 | 841.23 | 81.79 |
| 8.0 | 2080.18 | 1.071 | 868.17 | 80.50 | 1.15 | 762.5 | 85.58 | 1.194 | 708.62 | 88.17 |
| 8.1 | 2080.18 | 0.922 | 745.92 | 86.38 | 0.922 | 729.34 | 87.17 | 0.932 | 729.34 | 87.17 |
| 8.2 | 2080.18 | 0.845 | 859.88 | 80.90 | 0.961 | 812.22 | 83.19 | 0.987 | 716.91 | 87.77 |
| 8.3 | 2080.18 | 0.932 | 764.57 | 85.48 | 0.932 | 758.35 | 85.78 | 0.932 | 758.35 | 85.78 |
| 8.4 | 2080.18 | 1.106 | 1046.36 | 71.93 | 1.315 | 946.9 | 76.71 | 1.353 | 870.24 | 80.40 |
| | Crystallization reaction time: 120 min | | | Crystallization reaction time: 150 min | | | Crystallization reaction time: 180 min | | | |
| 7.5 | | 0 | 1955.97 | 28.20 | 0 | 1955.97 | 28.20 | 0 | 1955.97 | 28.20 |
| 7.6 | | 0.789 | 1272.21 | 61.08 | 0.789 | 1272.21 | 61.08 | 0.789 | 1272.21 | 61.08 |
| 7.7 | | 0.857 | 911.68 | 78.41 | 0.857 | 893.03 | 79.30 | 0.857 | 868.17 | 80.50 |
| 7.8 | | 1.096 | 859.88 | 80.90 | 1.096 | 851.59 | 81.30 | 1.096 | 845.38 | 81.59 |
| 7.9 | | 0.82 | 814.3 | 83.09 | 0.82 | 808.08 | 83.39 | 0.82 | 808.08 | 83.39 |
| 8.0 | | 1.194 | 708.62 | 88.17 | 1.194 | 692.05 | 88.96 | 1.194 | 692.05 | 88.96 |
| 8.1 | | 0.932 | 714.84 | 87.87 | 0.932 | 714.84 | 87.87 | 0.932 | 714.84 | 87.87 |
| 8.2 | | 0.987 | 708.62 | 88.17 | 0.987 | 696.19 | 88.77 | 0.987 | 694.12 | 88.87 |
| 8.3 | | 0.932 | 752.14 | 86.08 | 0.932 | 750.06 | 86.18 | 0.932 | 750.06 | 86.18 |
| 8.4 | | 1.397 | 812.22 | 83.19 | 1.397 | 812.22 | 83.19 | 1.397 | 812.22 | 83.19 |

As can be seen from Table 1, the optimum hydraulic retention time of the raw water in the crystallization reactor is about 60-90 min. Particularly, when the hydraulic retention time reaches 60 m or more and the crystallization pH is 8.0-8.3, the removal rate of temporary calcium hardness can reach more than 85%, and the cumulative dosage of calcium hydroxide is about 0.932-1.194 g/L. However, it would require about 1.4 g/L of calcium hydroxide to remove the same amount of temporary calcium hardness if using the lime softening method. Therefore, the method provided in this application can reduce calcium hydroxide consumption by about 14-32%.

As can be seen from Table 2, after precipitation and concentration for about 30 min, the supernatant volume ratio is usually not higher than 90%. Therefore, the volume of the crystal slurry storage part 201-1 is designed to be more than 10% of the volume of the precipitation-concentration tank 201. On the premise of ensuring a certain removal rate of temporary calcium hardness, when the crystallization pH is close to 8.0, the supernatant turbidity is relatively low, which can simplify the subsequent treatment processes for the RO concentrated water.

In summary, the present disclosure achieves the effective removal of temporary hardness from RO concentrated water

TABLE 2

Effects of precipitation time on the supernatant in the precipitation-concentration tank

| | Precipitation for 10 min | | Precipitation for 20 min | | Precipitation for 30 min | |
|---|---|---|---|---|---|---|
| Crystallization pH | Supernatant volume ratio | Supernatant turbidity (NTU) | Supernatant volume ratio | Supernatant turbidity (NTU) | Supernatant volume ratio | Supernatant turbidity (NTU) |
| 7.5 | / | 1 | / | / | / | / |
| 7.6 | 30% | 18.7 | 50% | 19.7 | 55% | 22.6 |
| 7.7 | 40% | 15.8 | 80% | 18.3 | 90% | 13.6 |
| 7.8 | 40% | 6.25 | 80% | 5.91 | 90% | 5.7 |
| 7.9 | 40% | 19.7 | 80% | 21.3 | 90% | 20.9 |
| 8.0 | 40% | 9.0 | 80% | 8.83 | 90% | 8.76 |
| 8.1 | 40% | 20.9 | 80% | 23.8 | 90% | 22.1 |
| 8.2 | 30% | 35.1 | 60% | 32.4 | 80% | 28.6 |
| 8.3 | 30% | 24.2 | 50% | 31.5 | 75% | 29.7 |
| 8.4 | 30% | 23.1 | 50% | 11.9 | 75% | 9.12 | by using the calcium bicarbonate crystallization. It should be noted that, as used herein, the terms "including", "comprising" or any other variants thereof are intended to cover a non-exclusive inclusion, such that a process, method, article, or apparatus including a series of elements includes not only those listed elements, but also other elements not expressly listed, or which are inherent to such process, method, article or apparatus. Without further limitation, the elements defined by the statement "including a . . . " do not exclude the existence of additional identical elements in the process, method, article, or apparatus including such elements.

Described above are only specific embodiments of the present disclosure to enable those skilled in the art to understand or implement the present disclosure. Though the disclosure has been described in detail above, those skilled in the art can still make various modifications, variations and replacements to these embodiments. It should be understood that those modifications, variations and replacements made without departing from the spirit or scope of the present disclosure shall fall within the scope of the disclosure defined by the appended claims.

What is claimed is:

1. A system for treating reverse-osmosis (RO) concentrated water with temporary hardness, comprising:
    a crystallization unit;
    a precipitation unit;
    a dewatering unit; and
    a programmable logic controller (PLC) system;
    wherein the crystallization unit, the precipitation unit, and the dewatering unit are connected in series; and the PLC system is configured to control pumps, valves, and displays in the crystallization unit, the precipitation unit, and the dewatering unit;
    the crystallization unit comprises a storage tank and a crystallization reactor; the storage tank is configured for holding a calcium hydroxide suspension; the storage tank is in communication with the crystallization reactor; a pH meter, a first liquid-level gauge, and a first stirrer are provided in the crystallization reactor; a pipe connecting the crystallization reactor with the RO concentrated water is provided with a water inlet pump and a water inlet valve; and a pipe connecting the crystallization reactor with the storage tank is provided with a feeding pump and a feeding valve;
    the precipitation unit comprises a precipitation-concentration tank; the precipitation-concentration tank is connected to an overflow port provided on a side wall of the crystallization reactor; the overflow port is provided with a first outlet valve; a telescopic baffle is provided in the precipitation-concentration tank to divide the precipitation-concentration tank into a crystal slurry storage part and a supernatant storage part; the precipitation-concentration tank is also provided with a second liquid-level gauge; a first liquid discharging end is provided at a bottom of the supernatant storage part; and a second outlet valve and a discharge pump are provided at the first liquid discharging end; and
    the dewatering unit comprises a horizontal spiral centrifuge and a freezer bin; a feeding end of the horizontal spiral centrifuge is connected to a first material discharging end arranged at a bottom of the precipitation-concentration tank; the first material discharging end is provided with a discharge valve; the horizontal spiral centrifuge has a second liquid discharging end and a second material discharging end; the second material discharging end is connected to the freezer bin; the second liquid discharging end is connected to the first liquid discharging end; and a one-way valve is provided at a position where the second liquid discharging end and the first liquid discharging end are connected.

2. The system of claim 1, wherein a volume between the overflow port and a top of the crystallization reactor is ⅓ of a volume of the crystallization reactor.

3. The system of claim 1, wherein a volume of the precipitation-concentration tank is not less than ⅓ of a volume of the crystallization reactor; and a top of the precipitation-concentration tank is lower than a position of the side wall of the crystallization reactor where the overflow port is located.

4. The system of claim 3, wherein a bottom diameter of the crystal slurry storage part is smaller than a top diameter of the crystal slurry storage part; and a volume of the crystal slurry storage part is 10% or more of the volume of the precipitation-concentration tank.

5. The system of claim 1, wherein an end cover is arranged at a top of the storage tank for sealing; a second stirrer is provided in the storage tank; and a mass percent concentration of the calcium hydroxide suspension is not less than 10%.

6. The system of claim 1, wherein a motion state of the telescopic baffle is controlled by the PLC system.

7. A method for treating RO concentrated water with temporary hardness, comprising:
    (S1) operating a first stirrer continuously such that a calcium hydroxide suspension in a storage tank is kept uniformly mixed;
    (S2) opening a water inlet valve and turning on a water inlet pump to allow the RO concentrated water to enter a crystallization reactor at a first preset rate; and turning on a second stirrer in the crystallization reactor, wherein a rotation speed of the second stirrer is controlled to be 80-120 r/min, and a ratio of a volume (L) of the crystallization reactor to the first preset rate (L/min) is not less than 90 min;
    (S3) opening a feeding valve and turning on a feeding pump to allow the calcium hydroxide suspension in the storage tank to enter the crystallization reactor at a second preset rate to be fully mixed with the RO concentrated water, so as to form a mixture, wherein the second preset rate is set such that a feeding rate of calcium hydroxide in the calcium hydroxide suspension is 0.1 g/(L min)+10%;
    (S4) sending, by a first liquid-level gauge, a first feedback signal to a PLC system after monitoring that a liquid level of the mixture in the crystallization reactor reaches a top of the crystallization reactor; under control of the PLC system, closing the water inlet valve and turning off the water inlet pump, and opening a first outlet valve, so that the mixture in the crystallization reactor is transferred to a precipitation-concentration tank; sending, by the first liquid-level gauge, a second feedback signal to the PLC system after monitoring that the liquid level of the mixture in the crystallization reactor is lower than the overflow port; and under the control of the PLC system, closing the first outlet valve, opening the water inlet valve and turning on the water inlet pump;
    (S5) subjecting the mixture to standing in the precipitation-concentration tank for a first preset duration for precipitation and clarification; controlling, by the PLC system, to close a telescopic baffle, open a second outlet valve and a discharge valve, and turn on a discharge pump, so that a supernatant in a supernatant storage part is discharged, and a calcium bicarbonate crystal slurry in a crystal slurry storage part flows into a horizontal spiral centrifuge;

(S6) discharging a liquid separated from the calcium bicarbonate crystal slurry; and transferring calcium bicarbonate crystals to a freezer bin, wherein a temperature in the freezer bin is not higher than 0° C.; and (S7) repeating steps (S4)-(S6) until the temporary hardness reaches a preset value.

8. The method of claim 7, further comprising:

monitoring a pH of the mixture in the crystallization reactor by using a pH meter in real time while performing steps (S3)-(S4);

wherein when the pH >8.30, the pH meter sends a third feedback signal to the PLC system, and under control of the PLC system, the feeding pump is turned off, and the feeding valve is closed to stop feeding; and when the pH<8.00, the pH meter sends a fourth feedback signal to the PLC system, and under the control of the PLC system, the feeding pump is turned off, and the feeding valve is opened to feed the calcium hydroxide suspension.

9. The method of claim 8, wherein a maximum hydraulic retention time of the RO concentrated water in the crystallization reactor is no less than 90 min, and a minimum hydraulic retention time of the RO concentrated water in the crystallization reactor is no less than 60 min.

10. The method of claim 9, wherein the first preset duration is not less than 25 min, and is not larger than a difference between the maximum hydraulic retention time and the minimum hydraulic retention time; and the difference between the maximum hydraulic retention time and the minimum hydraulic retention time is not less than 30 min.

11. The method of claim 7, wherein a maximum hydraulic retention time of the RO concentrated water in the crystallization reactor is no less than 90 min, and a minimum hydraulic retention time of the RO concentrated water in the crystallization reactor is no less than 60 min.

12. The method of claim 11, wherein the first preset duration is not less than 25 min, and is not larger than a difference between the maximum hydraulic retention time and the minimum hydraulic retention time; and the difference between the maximum hydraulic retention time and the minimum hydraulic retention time is not less than 30 min.

* * * * *